United States Patent
Buer et al.

(10) Patent No.: US 11,855,667 B2
(45) Date of Patent: *Dec. 26, 2023

(54) RADIO FREQUENCY LOOPBACK FOR TRANSCEIVERS

(71) Applicant: VIASAT, Inc., Carlsbad, CA (US)

(72) Inventors: Kenneth V. Buer, Gilbert, AZ (US); Ramanamurthy V. Darapu, Gilbert, AZ (US); Martin Gimersky, Lausanne (CH); David E. Pettit, Gilbert, AZ (US); Bill T. Agar, Scottsdale, AZ (US)

(73) Assignee: Viasat, Inc., Carlsbad, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 17/569,354

(22) Filed: Jan. 5, 2022

(65) Prior Publication Data

US 2022/0131562 A1 Apr. 28, 2022

Related U.S. Application Data

(63) Continuation of application No. 16/960,823, filed as application No. PCT/US2019/016273 on Feb. 1, 2019, now Pat. No. 11,258,472.

(Continued)

(51) Int. Cl.
*H04B 1/04* (2006.01)
*H04B 17/11* (2015.01)
(Continued)

(52) U.S. Cl.
CPC .......... *H04B 1/0475* (2013.01); *H04B 1/12* (2013.01); *H04B 1/44* (2013.01); *H04B 17/11* (2015.01);
(Continued)

(58) Field of Classification Search
CPC .......... H04B 1/0475; H04B 1/12; H04B 1/44; H04B 17/11; H04B 17/15; H04B 17/21; H04B 17/29; H04B 1/52
See application file for complete search history.

(56) References Cited

U.S. PATENT DOCUMENTS 6,608,527 B2 * 8/2003 Moloudi ............ H03H 21/0001
330/301
7,657,232 B2 * 2/2010 Palaskas ................... H03F 1/32
455/67.11

(Continued)

FOREIGN PATENT DOCUMENTS

CN 1331870 A 1/2002
CN 1759583 A 4/2006
(Continued)

OTHER PUBLICATIONS

International National Search Report and Written Opinion issued in co-pending International Application No. PCT/US2019/016273 dated May 2, 2019, in 11 pages.

(Continued)

*Primary Examiner* — Ankur Jain
(74) *Attorney, Agent, or Firm* — Holland & Hart LLP

(57) ABSTRACT

Methods and devices for radio frequency (RF) loopback for transceivers are described. A transceiver for communicating RF signals with a target device may transmit signals at a transmit frequency and receive signals at a (different) receive frequency. The transceiver may include a waveguide diplexer for separating and combining signals based on frequency. The transceiver may be configured to couple a loopback signal from a common port of the waveguide diplexer; the loopback signal may be based on a transmit signal. The transceiver may include a loopback translator to translate the loopback signal from the transmit frequency to the receive frequency and provide the translated loopback (Continued)

signal to a receiver used for receiving signals from the target device. The receiver may compare the translated loopback signal with a representation of the transmit signal to generate a compensation signal. A transmitter may use the compensation signal to adjust subsequent transmit signals.

27 Claims, 7 Drawing Sheets

Related U.S. Application Data

(60) Provisional application No. 62/625,443, filed on Feb. 2, 2018.

(51) Int. Cl.
*H04B 17/15* (2015.01)
*H04B 17/21* (2015.01)
*H04B 17/29* (2015.01)
*H04B 1/12* (2006.01)
*H04B 1/44* (2006.01)

(52) U.S. Cl.
CPC .............. *H04B 17/15* (2015.01); *H04B 17/21* (2015.01); *H04B 17/29* (2015.01)

(56) References Cited

U.S. PATENT DOCUMENTS

| | | | | |
|---|---|---|---|---|
| 8,023,588 B1* | 9/2011 | Benson | ............ | H04L 25/03343 330/147 |
| 8,463,189 B2* | 6/2013 | Bashir | ............ | H03F 3/217 455/63.1 |
| 8,489,045 B2* | 7/2013 | Ly-Gagnon | ............ | H03G 3/3042 455/115.2 |
| 8,918,060 B2* | 12/2014 | Duperray | ............ | H04B 17/19 455/67.14 |
| 9,136,887 B2* | 9/2015 | Zhao | ............ | H04B 1/0475 |
| 9,584,175 B2* | 2/2017 | Waheed | ............ | H04B 1/40 |
| 2006/0028296 A1* | 2/2006 | Yun | ............ | H01P 1/2138 333/126 |
| 2007/0082617 A1* | 4/2007 | McCallister | ............ | H04B 1/0475 455/63.1 |
| 2008/0144539 A1* | 6/2008 | Sperlich | ............ | H04L 27/368 370/278 |
| 2012/0257656 A1* | 10/2012 | Kang | ............ | H04B 1/525 375/221 |
| 2015/0280675 A1* | 10/2015 | Langer | ............ | H03G 3/3042 455/127.2 |
| 2016/0105299 A1* | 4/2016 | Chee | ............ | H04B 1/0475 375/297 |
| 2017/0110795 A1* | 4/2017 | Henry | ............ | H01Q 25/002 |
| 2017/0201368 A1 | 7/2017 | Hou et al. | | |

FOREIGN PATENT DOCUMENTS

| | | |
|---|---|---|
| CN | 101834625 A | 9/2010 |
| CN | 102090037 A | 6/2011 |
| CN | 103765783 A | 4/2014 |
| CN | 104247281 A | 4/2014 |
| CN | 106713195 A | 5/2017 |
| EP | 2752997 A1 | 7/2014 |
| WO | WO2006065462 A2 | 6/2006 |
| WO | WO2016140660 A1 | 9/2016 |

OTHER PUBLICATIONS

Andrisano, Oreste et al., "Effects of nonlinear power amplifiers on spectrum of CPFSK Signals" Military Communications Conference, MILCOM, Oct. 21-24, 1984, DOI: 10.119/MILCOM.1984. 4794892, pp. 452-457.

Icenbice, P.J., et al., "Linearity Testing Techniques for Sideband Equipment," Proceedings of the IRE, 44(12): 1175-1782, Dec. 1956 DOI: 10:1109/JRPROC.1956.275073.

* cited by examiner

RADIO FREQUENCY LOOPBACK FOR TRANSCEIVERS

CROSS REFERENCE

The present application for patent is a Continuation of U.S. patent application Ser. No. 16/960,823 by Buer et al., entitled "Radio Frequency Loopback For Transceivers" filed Jul. 8, 2020, which is a 371 National Phase Application of PCT/US2019/016273 by Buer et al., entitled "Radio Frequency Loopback For Transceivers" filed Feb. 1, 2019, which claims the benefit of U.S. Provisional Patent Application No. 62/625,443 by Buer et al., entitled "Radio Frequency Loopback For Transceivers," filed Feb. 2, 2018, assigned to the assignee hereof, and each of which expressly incorporated herein by reference.

BACKGROUND

The following relates generally to transceivers for radio frequency communications, and more specifically to radio frequency loopback for transceivers.

Many communication systems include radio frequency (RF) transmissions between a target device and a terminal. For example, radio frequency transmissions are used for communications between satellites and ground- or vehicle-based terminals, and for many other types of communications. In multi-frequency communication systems, RF signals may be received by a transceiver via an antenna, frequency-multiplexed using a waveguide diplexer, and converted to digital signals using an analog-to-digital converter (ADC) for additional processing. RF signals may be transmitted to the target device using a reverse process.

In some cases, an RF signal transmitted at the antenna may be different than the intended transmit signal due to distortion introduced into the signal along the transmit path. For example, the transmit signal may be affected by process variations or imperfections in the transceiver's analog and/or RF hardware, such as in the waveguide diplexer, power amplifiers, digital-to-analog converters (DACs), and/or filters, for example. RF transmit signals may also be affected by transceiver operating conditions, such as temperature. It may be desirable to compensate for such distortion before transmitting an RF signal to a target device.

SUMMARY

The described systems and techniques relate to improved methods, devices, and apparatuses that support satellite terminal radio frequency loopback. Generally, the described systems and techniques enable a transceiver to perform self-testing and adjust signals to be transmitted to a target device using a loopback signal from a waveguide diplexer in the transceiver. The loopback signal may be a feedback signal that is generated from an RF transmit signal in the waveguide diplexer. A frequency-translated version of the loopback signal may be provided to a receiver in the transceiver. The receiver may compare the translated loopback signal with a representation of the intended transmit signal and generate a compensation signal based on the comparison. A transmitter in the transceiver may use the compensation signal to adjust subsequent signals to be transmitted to the target device. Thus, the loopback signal may enable the transceiver to adjust transmissions to compensate for distortion introduced into the transmit signal from the digital domain to the RF domain.

A transceiver for communicating with a target device is described. The transceiver may include a waveguide diplexer having a common port coupled to first and second individual ports, the first individual port associated with a transmit frequency range and the second individual port associated with a receive frequency range. The transceiver may include a transmitter coupled with the first individual port of the waveguide diplexer and configured to output a transmit signal to the first individual port within the transmit frequency range. The transceiver may include a bidirectional coupler having a coupled port coupled with the common port of the waveguide diplexer. The transceiver may include a loopback translator coupled with the coupled port and configured to obtain a loopback signal associated with the transmit signal via the coupled port, and to translate the loopback signal from within the transmit frequency range to within the receive frequency range. The transceiver may include a receiver having in input port coupled with the second individual port of the waveguide diplexer and coupled with the loopback translator via a loopback path, where the receiver is configured to, in a first mode, obtain a received signal from the target device via the waveguide diplexer, and, in a second mode, obtain the translated loopback signal via the loopback path and compare the translated loopback signal to a representation of the transmit signal to generate a compensation signal, where the transmitter is further configured to receive the compensation signal and adjust the transmit signal based at least in part on the compensation signal.

A method for compensating transmit signals transmitted to a target device is described. The method may include providing a first transmit signal to a first individual port of a waveguide diplexer, the waveguide diplexer having a common port coupled to the first individual port and a second individual port, the first individual port associated with a transmit frequency range and the second individual port associated with a receive frequency range. The method may include coupling a loopback signal associated with the first transmit signal from the common port of the waveguide diplexer. The method may include translating the loopback signal from within the transmit frequency range to within the receive frequency range. The method may include inputting, to a receiver while in a first mode, a receive signal from the target device via the waveguide diplexer, and inputting, to the receiver while in a second mode, the translated loopback signal via a loopback path. The method may include comparing, in the second mode, the translated loopback signal with a representation of the first transmit signal and adjusting a second transmit signal based on the comparison. The method may include providing the second transmit signal to the first individual port of the waveguide diplexer for transmission to the target device.

DETAILED DESCRIPTION

Figure 1:
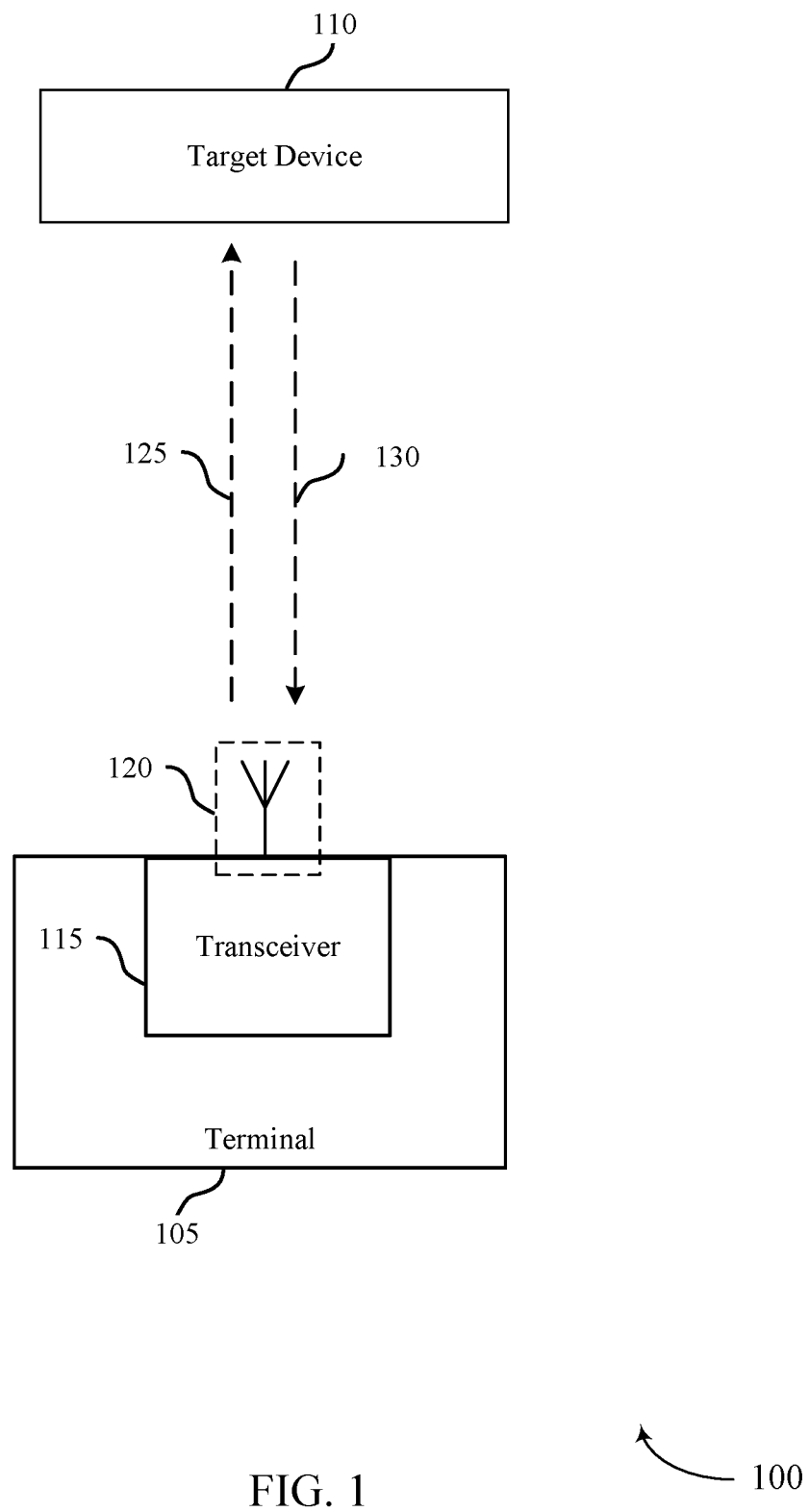
FIG. 1 illustrates an example of an RF communication system that supports satellite terminal radio frequency loopback in accordance with aspects of the present disclosure.

Many communication systems use radio frequency (RF) signals for communications between a target device and a terminal. For example, RF signals are used for communications between satellites and ground-based or vehicle-based terminals, and for many other types of communications.

A terminal may include a transceiver for transmitting and receiving RF signals to and from the target device via an antenna. In some cases, the transceiver may be a multi-frequency transceiver that transmits RF signals at frequencies within a first frequency range and receives RF signals at frequencies within a second (different) frequency range. For example, the transceiver may transmit signals at approximately 30 GHz and may receive signals at approximately 20 GHz. Using different frequencies for transmitting and receiving may reduce interference between transmitted and received signals and/or allow the transceiver to concurrently transmit and receive signals.

In some cases, a multi-frequency transceiver may include a waveguide diplexer for frequency-domain multiplexing of RF signals. The waveguide diplexer may serve as a filter that separates or combines RF signals based on frequency. The waveguide diplexer may include three ports: a first individual port that passes signals within a first frequency range (e.g., a transmit frequency range) and rejects signals outside of that range, a second individual port that passes signals within a second frequency range (e.g., a receive frequency range) and rejects signals outside of that range, and a common port coupled with the first individual port and second individual port that passes signals in both frequency ranges. The common port of the waveguide diplexer may be coupled with an antenna for transmitting and receiving signals with the target device.

In some cases, a receive path of a transceiver (e.g., an electrical path along which signals may be received from the target device) may include the waveguide diplexer, an analog-to-digital converter (ADC) to convert the received signal to the digital domain, and various other analog and/or digital components along the way.

Similarly, a transmit path of a transceiver may include a digital-to-analog converter (DAC) to convert a digital transmit signal to an analog transmit signal, a high-powered amplifier to amplify the transmit signal, the waveguide diplexer, and various other analog and/or digital components along the way.

In some cases, signals to be transmitted from the terminal to the target device may be affected (e.g., distorted) by various characteristics or operating conditions of the transceiver, such as by process variations associated with components in the transmit path, noise, amplitude/phase distortions, or non-linearities introduced by components in the transmit path, and/or temperature variations during operation, for example. Thus, the actual RF signal transmitted by a transceiver may differ from the intended transmit signal; e.g., the transmit signal generated in the digital domain.

Some transceivers may include a feedback mechanism to compensate for such distortion before the signal is transmitted to the target device; e.g., to pre-adjust transmit signals before they are provided to the antenna for transmission. In some cases, the feedback mechanism may include a feedback signal that is generated in the digital or analog domain of the transceiver; that is, a feedback signal may be obtained from a node in the digital or analog portion of the transmit path and may be fed back to a processor in the transceiver. The processor may adjust subsequent transmit signals in the digital domain based on the feedback. This approach, however, may neglect the effect of components that are downstream from the node in the transmit path. Thus, it may be desirable to provide feedback from a node that is as close to the antenna as possible.

In some cases, a transceiver may be calibrated before it is deployed in the field to characterize the effects of such variations. The transceiver may be calibrated by running a calibration test (e.g., using separate calibration equipment) to characterize these effects. The resulting calibration information may be stored in the terminal to enable subsequent adjustment of signals during operation. Similarly, a transceiver may perform self-testing before it is deployed to test various components in the transceiver. Such one-time calibration tests and self-tests may not, however, capture dynamic effects that may arise due to temperature variations during operation of the transceiver in the field or due to component aging, for example. Thus, it may be desirable to enable self-test and calibration of a transceiver in the field, such as while the transceiver is deployed and configured to communicate with a target device. Moreover, it may be desirable to enable real-time calibration, self-test, and signal compensation while the transceiver is actively communicating with a target device.

According to various aspects, a loopback translator coupled with a loopback path to the receiver may address the dual objectives of providing feedback from a node that is close to the antenna and enabling calibration and self-test in the field. For example, a transceiver may include a loopback path for providing a loopback signal from the waveguide diplexer to a receiver. The loopback signal may be a frequency translated version of the transmit signal that enables the transceiver to adjust the transmit signal based on feedback from the RF domain (e.g., the waveguide diplexer) rather than from the analog or digital domain. In this case, the loopback signal may include the effect of components in the transmit path between the digital domain and the RF domain, thereby potentially providing a more accurate feedback mechanism.

In some cases, the loopback signal may be obtained from the waveguide diplexer by, for example, coupling an RF transmit signal from the common port of the waveguide diplexer to generate an analog loopback signal. In this case, the loopback signal may be based on the transmit signal and may have a frequency within the transmit frequency range.

The loopback signal may be provided to a loopback translator in the transceiver. The loopback translator may translate the loopback signal from within the transmit frequency range to within the receive frequency range, thereby generating a translated loopback signal. In some cases, the transmit frequency range may include higher frequencies than the receive frequency range. Returning to the previous example, the loopback translator may translate, for example, a coupled version of a 30 GHz transmit signal (e.g., loopback signal) to a 20 GHz translated loopback signal. The translated loopback signal may then be provided, via a loopback path, to a receiver in the transceiver.

The receiver may be used for receiving signals from the target device at frequencies within the receive frequency range and may also be used for receiving the translated loopback signal within the receive frequency range. The receiver may be coupled with the second individual port of the waveguide diplexer for receiving signals at the receive frequencies from the waveguide diplexer.

In some cases, translating the loopback signal from the transmit frequency range to the receive frequency range allows the same receiver hardware (e.g., low noise amplifier (LNA), downconverter, demodulator) to be used for receiving signals from the target device (via the waveguide diplexer) and for receiving the translated loopback signal, thereby enabling the transceiver to compensate transmit signals in the field without having separate receiver circuitry for receiving signals in the transmit frequency range.

In some cases, the receiver may compare the translated loopback signal to a representation of the transmit signal on which the loopback signal is based, such as a stored version of the transmit signal. The receiver may generate a compensation signal based on the comparison and may provide the compensation signal to the transmitter to enable the transmitter to adjust subsequent transmissions based on the compensation signal.

As previously noted, the receiver may receive the translated loopback signal via a loopback path. In some cases, the loopback path may include a path through the waveguide diplexer; that is, the translated loopback signal may be "looped back" from the loopback translator through the common port of the waveguide diplexer to the second individual port of the waveguide diplexer and provided to the receiver via the second individual port. In this case, the path from the second individual port to the receiver may be shared by the loopback path and the receive path such that the receiver can receive signals from the target device and receive the translated loopback signal at different times using the same path.

In some cases, a transceiver may include a second loopback path, such as a direct connection between the loopback translator and the receiver. In this case, the translated loopback signal may be provided to the receiver via the second loopback path without using the receive path.

In some cases, a transceiver may include two waveguide diplexers that may be configured to pass the same transmit and receive frequency ranges, but may each be associated with a different signal polarization, such as a left-hand circular polarization (LHCP) or right-hand circular polarization (RHCP). Both waveguide diplexers may be coupled with the same antenna via a polarizer (e.g., septum polarizer), for example. In this case, the transceiver may also include two receivers, and may be capable of receiving two signals having substantially the same frequency (e.g., within the receive frequency range) but different polarizations. Similarly, the transceiver may be capable of transmitting via either LHCP or RHCP (e.g., via different waveguide diplexers). Additionally or alternatively, the transceiver may have multiple transmitters, and may be capable of concurrently transmitting LHCP and RHCP signals with substantially the same frequency (e.g., within the transmit frequency range). The second waveguide diplexer may also be used to generate a loopback signal, and a receive signal switch matrix may be used to route the loopback signal and signals received from the target device to an available receiver.

Systems and techniques for radio frequency loopback for transceivers as described herein may provide many benefits. For example, transceivers described herein may enable self-test and compensation of transmission signals while the transceiver is "on air;" e.g., while the transceiver is deployed in the field and may be actively communicating with a target device. Thus, transceivers described herein may be able to compensate transmission signals based on real-time operating conditions and maintain calibration over time in the presence of temperature variations and component aging. Moreover, transceivers described herein may use the same receiver hardware for receiving a loopback signal and for receiving signals from the target device. Such shared receiver functionality may reduce the need for additional hardware to compensate transmission signals. Still further, the transceivers described herein provide feedback from the RF domain (e.g., from the waveguide diplexer), which may capture the effects of more components in the transmit path than feedback from the analog or digital domain. This technique may, in turn, enable the use of lower-cost components, such as lower-cost power amplifiers, because any additional distortion introduced by the lower-cost components may be compensated by the transmitter.

Aspects of the disclosure are initially described in the context of an RF communication system. Aspects of the disclosure are further illustrated by and described with reference to simplified transceiver circuits and waveguide diplexers. Aspects of the disclosure are further illustrated by and described with reference to apparatus diagrams, system diagrams, and flowcharts that relate to satellite terminal radio frequency loopback. Although described with the example that the transmit frequency range is higher than the receive frequency range, it should be understood that the techniques discussed above for radio frequency loopback may be applied where the transmit frequency range is lower than the receive frequency range.

FIG. 1 illustrates an example of an RF communication system 100. RF communication system includes a terminal device 105 that may communicate with a target device 110 by transmitting RF transmit signals 125 and receiving RF receive signals 130 via antenna 120 and transceiver 115. In some cases, antenna 120 may be part of transceiver 115 and/or terminal device 105. In some cases, terminal device 105 may be a gateway or user terminal device that may be stationary or may be located on a vehicle, such as on an airplane or ship. In some cases, target device 110 may be a satellite.

In some cases, RF transmit signals 125 may be transmitted at a frequency within a transmit frequency range, and RF receive signals 130 may be received at a frequency within a (different) receive frequency range.

In some cases, transceiver 115 may be configured to adjust transmit signals to compensate for distortion introduced in the transmit path by obtaining, from a waveguide diplexer in transceiver 115, a loopback signal associated with a transmit signal in the waveguide diplexer, translating the loopback signal from the transmit frequency range to the receive frequency range, comparing the translated loopback signal with a representation of the transmit signal, and adjusting subsequent transmit signals based on the comparison.

Additional details regarding the circuitry and operation of transceiver 115 are discussed with reference to FIGS. 2 through 6.

Figure 2:
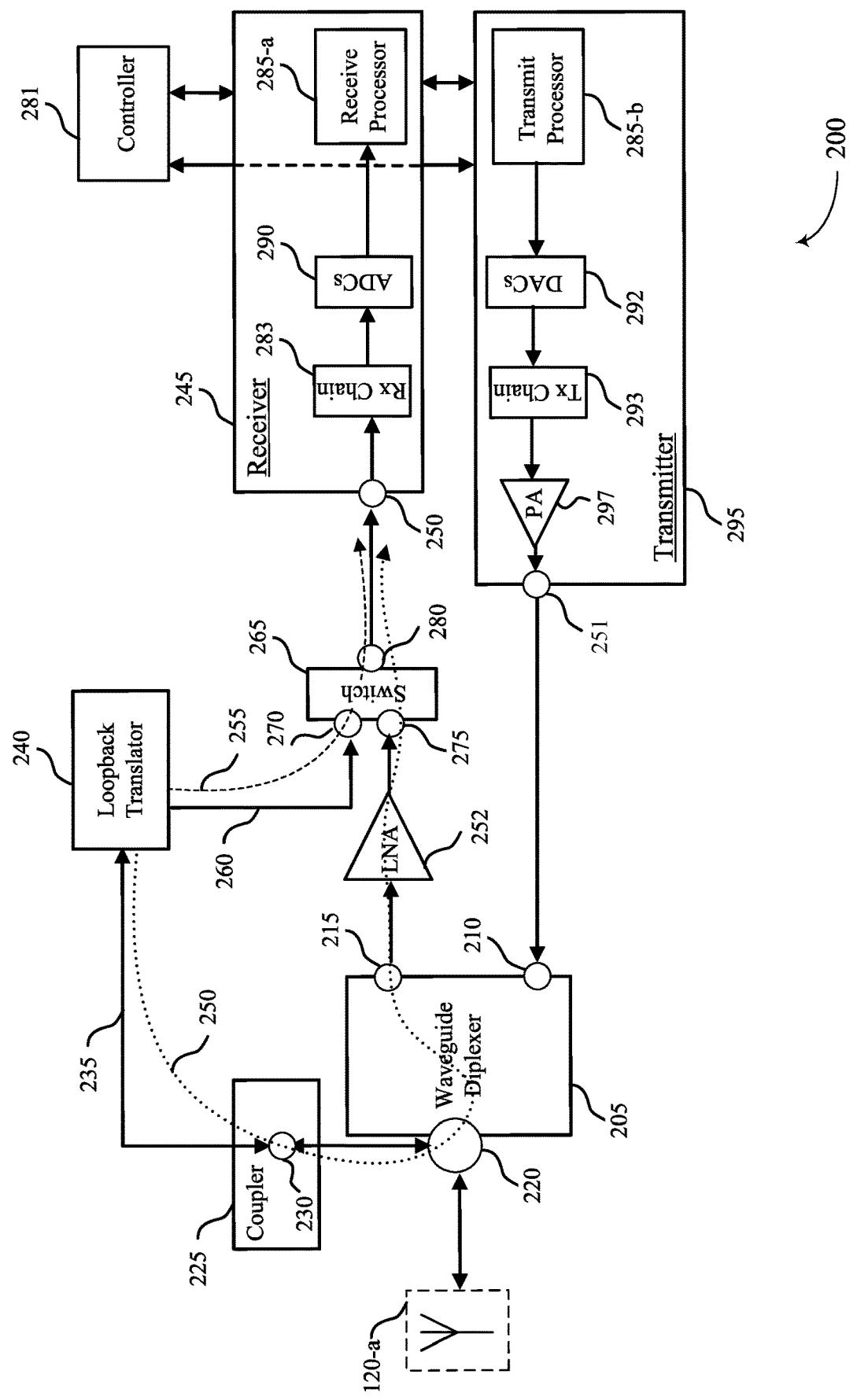
FIG. 2 illustrates an example of a transceiver that supports satellite terminal radio frequency loopback in accordance with aspects of the present disclosure.

FIG. 2 illustrates a simplified example of a transceiver 200 that supports satellite terminal radio frequency loopback in accordance with aspects of the present disclosure. In some examples, transceiver 200 may be an example of transceiver 115 in RF communication system 100. In some cases, transceiver 200 may include additional components that are omitted from FIG. 2 for clarity.

Transceiver 200 includes antenna 120-a, which may be used to receive and transmit RF signals to and from a target device as depicted in FIG. 1. Antenna 120-a may include, for example, a horn antenna or feedhorn, and signals may be directed to antenna 120-a via a reflector (e.g., parabolic reflector). In some cases, antenna 120-a may include a phased array.

Transceiver 200 includes waveguide diplexer 205. Waveguide diplexer 205 has a first individual port 210 associated with a transmit frequency range, a second individual port 215 associated with a receive frequency range different than the transmit frequency range, and a common port 220 coupled with the first individual port 210 and the second individual port 215 and associated with the transmit frequency range and the receive frequency range.

The first individual port 210 may be coupled with the common port via a first waveguide that is configured to pass signals within the transmit frequency range and may reject signals outside of the transmit frequency range. The second individual port 215 may be coupled with the common port via a second waveguide that is configured to pass signals within the receive frequency range and may reject signals outside of the receive frequency range. The first and second waveguides may be coupled with the common port via a junction (e.g., E-plane T-junction, H-plane T-junction). The common port 220 may be a waveguide that is configured to pass signals within the transmit frequency range and the receive frequency range and may reject signals outside of the transmit frequency range and receive frequency range.

The common port 220 may be a waveguide that is coupled with antenna 120-a to provide signals to the antenna that are within the transmit frequency range and to receive signals from antenna 120-a within that are within the receive frequency range. In some cases, the first individual port may be used for transmitting signals to the target device (e.g., via common port 220 and antenna 120-a), the second individual port may be used for receiving signals from the target device (e.g., via antenna 120-a and common port 220). Thus, the waveguide diplexer may be configured to enable bidirectional, multi-frequency RF communications with the target device. Examples of waveguide diplexer 205 are further described and depicted with reference to FIGS. 5 and 6.

Transceiver 200 includes a bidirectional coupler 225 having a coupled port 230. Coupled port 230 may be coupled with common port 220 and with conductive connection 235 and may be used to couple RF signals from the common port onto conductive connection 235, and/or to couple analog signals on conductive connection 235 into the common port 220. That is, coupler 225 may be used to induce (e.g., generate) an analog signal on conductive connection 235 based on an RF signal in common port 220, or to induce an RF signal in common port 220 based on an analog signal on conductive connection 235.

Figure 5:
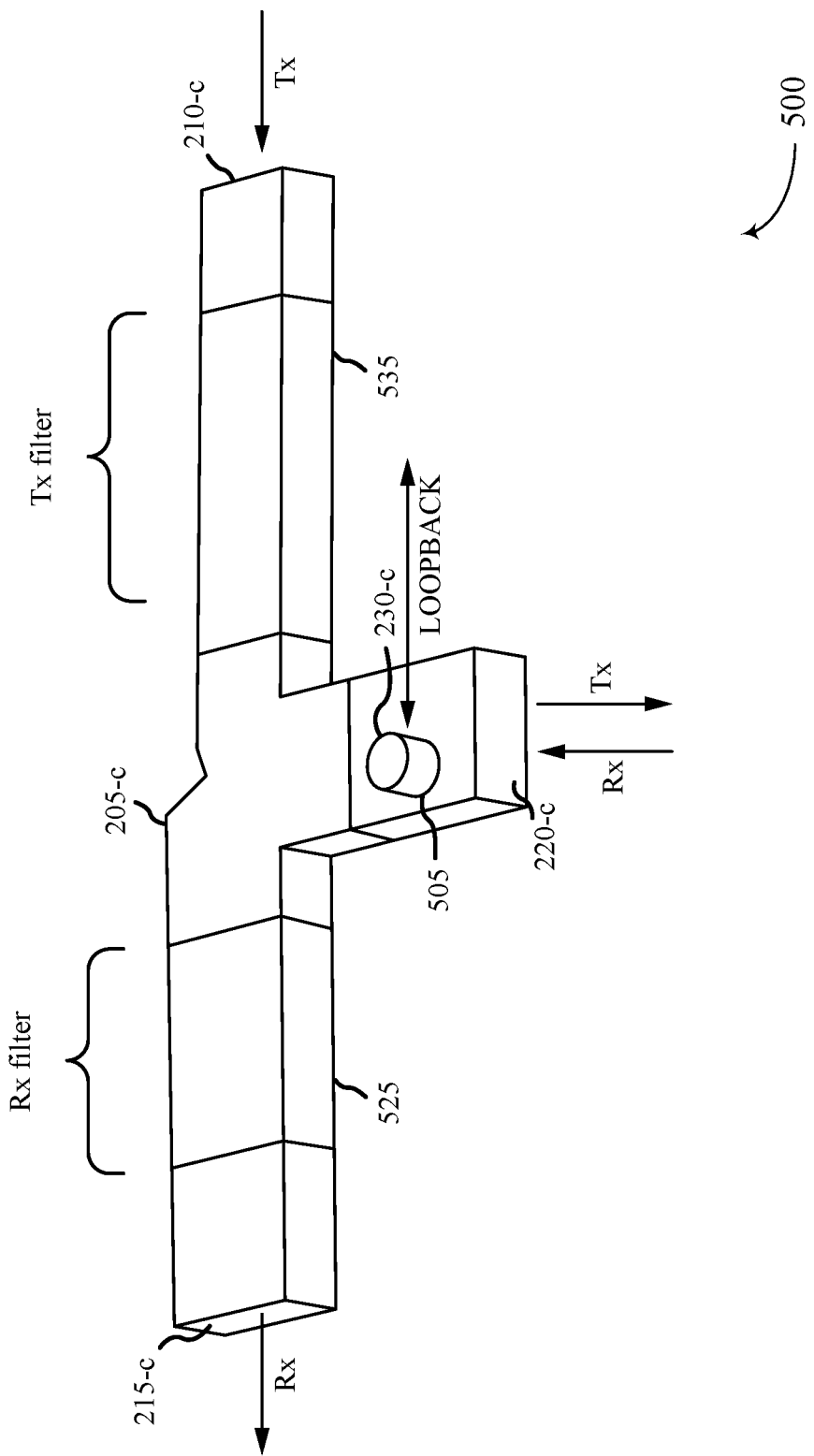
FIG. 5 illustrates an example of a waveguide device that supports satellite terminal radio frequency loopback in accordance with aspects of the present disclosure.

In some cases, coupler 225 may be a passive coupler that bidirectionally couples signals between the common port 220 and the conductive connection 235 when signals are present in the common port 220 or on the conductive connection 235. In some cases, coupled port 230 may be or may include a coupling hole in or on the common port 220 (or a waveguide coupled with the common port 220) to enable bidirectional coupling between the common port 220 and the conductive connection 235, as depicted in the example of FIG. 5.

In some cases, coupler 225 may couple a transmit signal from common port 220 to induce a loopback signal on conductive connection 235 that is based on the RF transmit signal in the common port 220. Because the loopback signal is based on the transmit signal, the loopback signal may have a frequency that is within the transmit frequency range.

Figure 4:
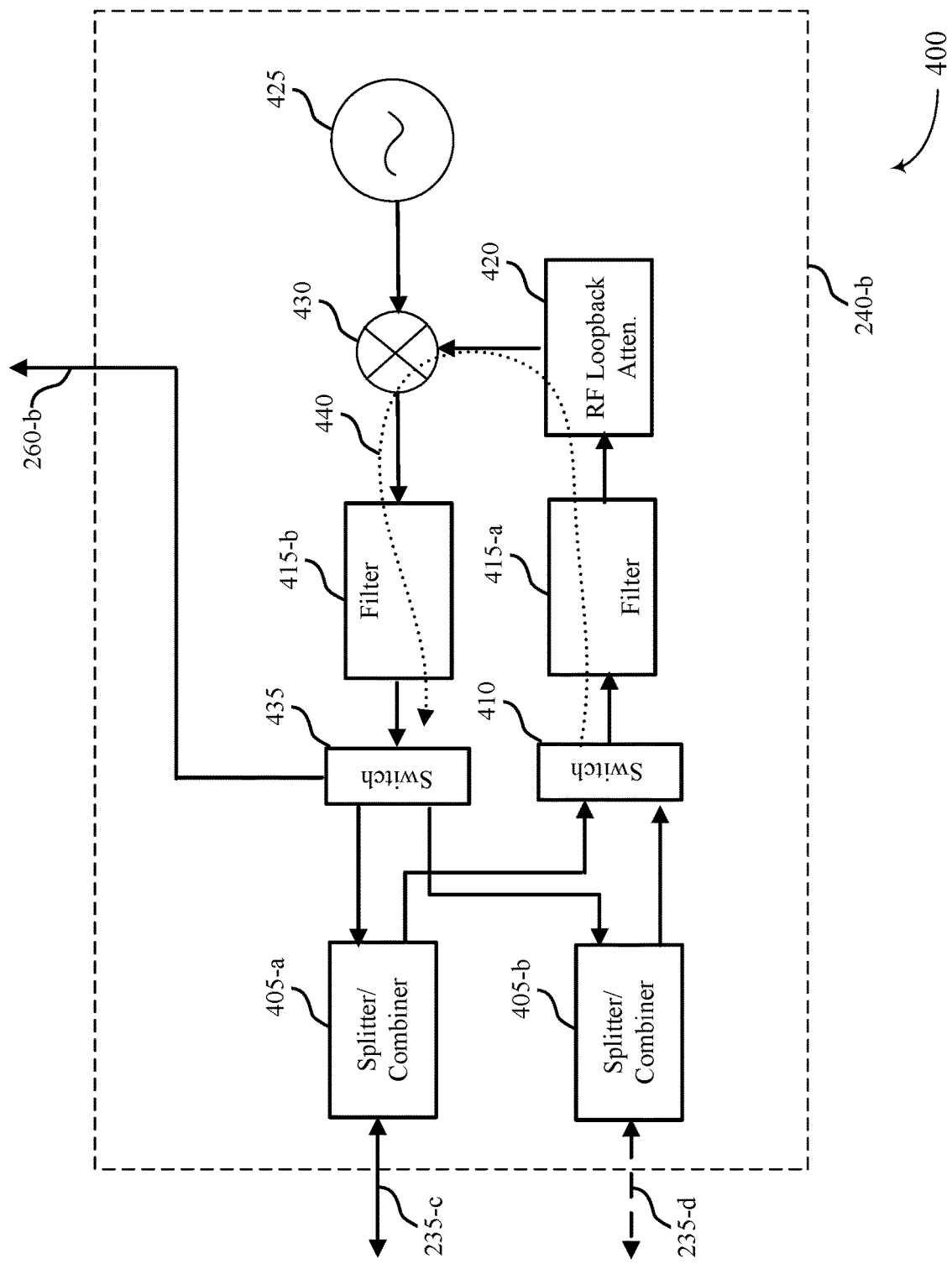
FIG. 4 illustrates an example of a loopback translator that supports satellite terminal radio frequency loopback in accordance with aspects of the present disclosure.

Transceiver 200 includes a loopback translator 240. Loopback translator 240 may be coupled with the coupled port 230 via conductive connection 235 and may be configured to obtain the loopback signal via coupled port 230. Loopback translator 240 may be configured to translate the loopback signal from a frequency within the transmit frequency range to a frequency within the receive frequency range to generate a translated loopback signal. Loopback translator 240 may include various circuitry for performing the frequency translation, as depicted in the example of FIG. 4.

Transceiver 200 includes receiver 245. Receiver 245 may be coupled with second individual port 215 of waveguide diplexer 205 and may be configured to receive signals from the target device via waveguide diplexer 205. Receiver 245 may include a receive (Rx) chain 283, which may include various components for amplifying, filtering, downconverting, or demodulating received signals or for performing other functionality. Receiver 245 may include one or more analog-to-digital converters (ADCs) 290 for converting signals received by receiver 245 from the analog domain to the digital domain. Receiver 245 may include receiver processor 285-a for processing received signals in the digital domain. Receive processor 285-a may include a microprocessor, microcontroller, digital signal processor (DSP), field-programmable gate array (FPGA), application-specific integrated circuit (ASIC), and/or other type of processing hardware. Receiver 245 may include various other components that are not shown in FIG. 2 for clarity.

Receiver 245 may also be configured to receive the translated loopback signal from the loopback translator 240 via a loopback path, and to compare the translated loopback signal with a representation of the transmit signal on which the loopback signal is based (e.g., the transmit signal from which the loopback signal was coupled). The representation of the transmit signal may be, for example, a digital representation of the transmit signal saved by transceiver 200 for subsequent use by receiver 245. In some cases, receiver 245 may be configured to generate a compensation signal based on the comparison of the translated loopback signal with the representation of the transmit signal. In some cases, receiver 245 may compare the translated loopback signal with the representation of the transmit signal and generate the compensation signal using receive processor 285-a, for example. The compensation signal may subsequently be used by a transmitter 295 in transceiver 200 to compensate (e.g., adjust) transmit signals.

In some cases, the loopback path may be or may include loopback path 250. In this case, the translated loopback signal from loopback translator 240 is looped back through the coupled port 230 into the common port 220 and provided to the receiver 245 via the second individual port 215. That is, the loopback path 250 may include the common port 220 and second individual port 215 of the waveguide diplexer. In this case, receiver 245 may receive signals from the target device and receive the translated loopback signal from second individual port 215 at different times, allowing transceiver 200 to perform transmit signal compensation using existing circuitry. However, in this case, transceiver 200 may not be able to perform signal compensation while receiver 245 is actively receiving signals from the target device, because the loopback signal and receive signals from the target device would interfere with each other (e.g., second individual port 215 may already be in use).

In some cases, transceiver 200 may include conductive connection 260 to provide a second loopback path 255 from loopback translator 240 to receiver 245. Loopback path 255 may enable loopback translator 240 to provide a translated loopback signal to receiver 245 without looping back through waveguide diplexer 205 and without using second individual port 215.

In this case, transceiver 200 may include switch 265 to enable receiver 245 to selectively receive signals via either loopback path 255 or via second individual port 215. That is, receiver 245 may selectively receive signals received from the target device (via second individual port 215), or the translated loopback signal (via conductive connection 260).

Switch 265 may include a first input port 270 coupled with conductive connection 260 and a second input port 275 coupled with second individual port 215. Switch 265 may include an output port 280 coupled with an input port 250 of receiver 245. Switch 265 may be configured to select input port 270 or input port 275 for coupling with output port 280.

For example, if switch 265 selects input port 270, switch 265 may establish an electrical connection between conductive connection 260 and receiver 245. Thus, switch 265 may select input port 270 to provide a translated loopback signal to receiver 245 by establishing loopback path 255.

For example, if switch 265 selects input port 275, switch 265 may establish an electrical connection between second individual port 215 and receiver 245. Thus, switch 265 may select input port 275 to provide a signal received from the target device to receiver 245, or to provide the translated loopback signal to receiver 245 by establishing loopback path 250.

In some cases, transceiver 200 may include LNA 252 between the second individual port 215 and the receiver 245 for amplifying a signal received from the target device or the translated loopback signal (e.g., prior to switch 265 or Rx chain 283).

In some cases, transceiver 200 (or portions of transceiver 200, such as switch 265, receiver 245, coupler 225, and/or loopback translator 240) may be configured to operate in either a first mode associated with receiving signals from the target device or in a second mode associated with receiving the translated loopback signal to perform transmit signal compensation. For example, in some cases, transceiver 200 may include a controller 281 that may configure transceiver 200 (or portions of transceiver 200, such as switch 265, receiver 245, coupler 225, and/or loopback translator 240) to operate in the first mode or the second mode by providing various control signals to switch 265, receiver 245, coupler 225, loopback translator 240, and/or to other components in transceiver 200 to cause transceiver 200 to operate in the first mode or the second mode.

Thus, receiver 245 may be configured to, in the first mode, receive a signal received from the target device, and to, in the second mode, receive the translated loopback signal from the loopback translator 240 (e.g., via loopback path 250 or loopback path 255). For example, loopback translator 240 may be configured to, in the second mode, input the translated loopback signal to the common port 220 of the waveguide diplexer 205 via coupler 225. Alternatively, when present, switch 265 may be configured to output to receiver 245, in the first mode, a signal received from the target device (e.g., by selecting input port 275), and to output to the receiver, in the second mode, the translated loopback signal (e.g., by selecting port 270 to select loopback path 255, or by selecting input port 275 to select loopback path 250).

In some cases, receiver 245 may be configured to, in the second mode, obtain the translated loopback signal and/or compare the translated loopback signal with the representation of the transmit signal upon which the loopback signal is based. Receiver 245 may be configured to generate a compensation signal based on the comparison of the translated loopback signal with the representation of the transmit signal.

In some cases, receiver 245 may be configured to enter the second mode periodically to receive the translated loopback signal from the loopback translator. That is, receiver 245 may be configured to receive the loopback signal periodically, at predetermined time intervals, such as for periodic self-test or calibration. In some cases, transceiver 200 may store calibration values associated with the self-test or calibration, which may subsequently be used to adjust transmit signals or for diagnostic purposes.

In some cases, receiver 245 may be configured to enter the second mode based on the scheduling of downlink communications from the target device (e.g., availability of receiver 245 to receive a translated loopback signal). For example, receiver 245 may be configured to enter the second mode at times when receiver 245 is not receiving a signal from the target device and therefore may be able to obtain the translated loopback signal via loopback path 250.

In some cases, receiver 245 may be configured to enter the second mode in response to receiving a command or a trigger. For example, receiver 245 may receive a command from, e.g., processor 285-a or 285-b or another source specifying that receiver 245 should perform a self-test or calibration routine, and receiver 245 may respond to receiving the command by entering the second mode to obtain the translated loopback signal, compare the translated loopback signal with the representation of the transmit signal, and generate a compensation signal. Additionally or alternatively, a trigger indicating that receiver 245 should enter the second mode may be identified in response to detecting a change in transceiver operating conditions, such as a change in temperature, location, time of day, or other operating condition. In some cases, receiver 245 may be configured to enter the second mode based on a trigger and receiver availability (e.g., entering the second mode at a next available time period after a trigger).

In some cases, receiver 245 may compare the translated loopback signal with the representation of the transmit signal by comparing, for example, the frequency, phase, polarity, and/or power of the two signals. In some cases, the compensation signal may be based on the comparison, and may include an indication of the difference in frequency, phase, polarity, and/or power of the two signals, such as an indication of an amount of the difference(s), a sign of the difference(s) (e.g., positive or negative), etc. In some cases, the compensation signal may include an indication of an amount by which to adjust transmit signals, such as an amount of frequency, phase, or power.

In some cases, the compensation signal may be provided to transmitter 295 to enable transmitter 295 to adjust transmit signals based on the compensation signal.

Transmitter 295 may be coupled with receiver 245 and with first individual port 210 of waveguide diplexer 205. Transmitter 295 may be configured to output transmit signals (e.g., signals to be transmitted to a target device) via output port 251 to first individual port 210. Transmitter 295 may be configured to output the transmit signals at a frequency within the transmit frequency range, for example.

Transmitter 295 may include transmit processor 285-b for adjusting transmit signals based on the compensation signal.

Transmit processor 285-*b* may include a microprocessor, microcontroller, DSP, FPGA, ASIC, and/or other type of processing hardware. In some cases, transmit processor 285-*b* may be coupled with receive processor 285-*a*. In some cases, transmit processor 285-*b* may share some or all of its processing hardware with receive processor 285-*a*. In some cases, transmit processor 285-*b* may be the same processor as receive processor 285-*a*.

Transmitter 295 may include one or more digital-to-analog converters (DACs) 292 for converting digital signals to analog signals. Transmitter 295 may include a transmit chain 293, which may include various components for upconverting and/or modulating signals to be transmitted or for performing other functionality.

In some cases, transmitter 295 may include a power amplifier (PA) 297 for amplifying the adjusted transmit signal; e.g., for amplifying the power of the transmit signal after transmitter 295 has adjusted the transmit signal. Power amplifier 297 may be coupled (e.g., via output port 251) with the first individual port 210 of waveguide diplexer 205. Transmitter 295 may include various other components that are not shown in FIG. 2 for clarity.

Transmitter 295 may be configured to adjust transmit signals in a variety of manners, based on the compensation signal. For example, transmitter 295 may be configured to adjust transmit signals by adjusting the frequency, phase, or polarity of the transmit signals to compensate for distortion introduced in the transmit path as identified by comparing the translated loopback signal and the transmit signal.

In some cases, the transmit signal may be modulated using, for example, quadrature amplitude modulation (QAM) or another modulation scheme. In this case, the signal may be transmitted by transmitting symbols (e.g., QAM symbols) at a particular symbol rate, where the symbol rate is the number of symbols transmitted per unit time. In some cases, transmitter 295 may be configured to adjust transmit signals by adjusting the symbol rate of the transmit signals based on the compensation signal. For example, the transmitter 295 may increase or decrease the symbol rate of the transmit signals depending on the amount of distortion introduced into the transmit signal.

In some cases, transmitter 295 may be configured to adjust transmit signals by adjusting the slew rate of the transmit signals based on the compensation signal. The slew rate may be the rate at which a signal transitions from a high voltage to a low voltage (or vice versa); that is, the slew rate may represent the slope of the transition between high and low voltages.

In some cases, transmitter 295 may be configured to adjust transmit signals by adjusting a frequency-dependent gain slope, a frequency-dependent phase variation, a time-dependent transient amplitude, a time-dependent transient phase, a frequency and amplitude dependent amplitude modulation, and/or a frequency and amplitude dependent phase modulation.

In some cases, transmitter 295 may be configured to adjust transmit signals by adjusting the transmit power of the transmit signals based on the compensation signal.

Figure 3:
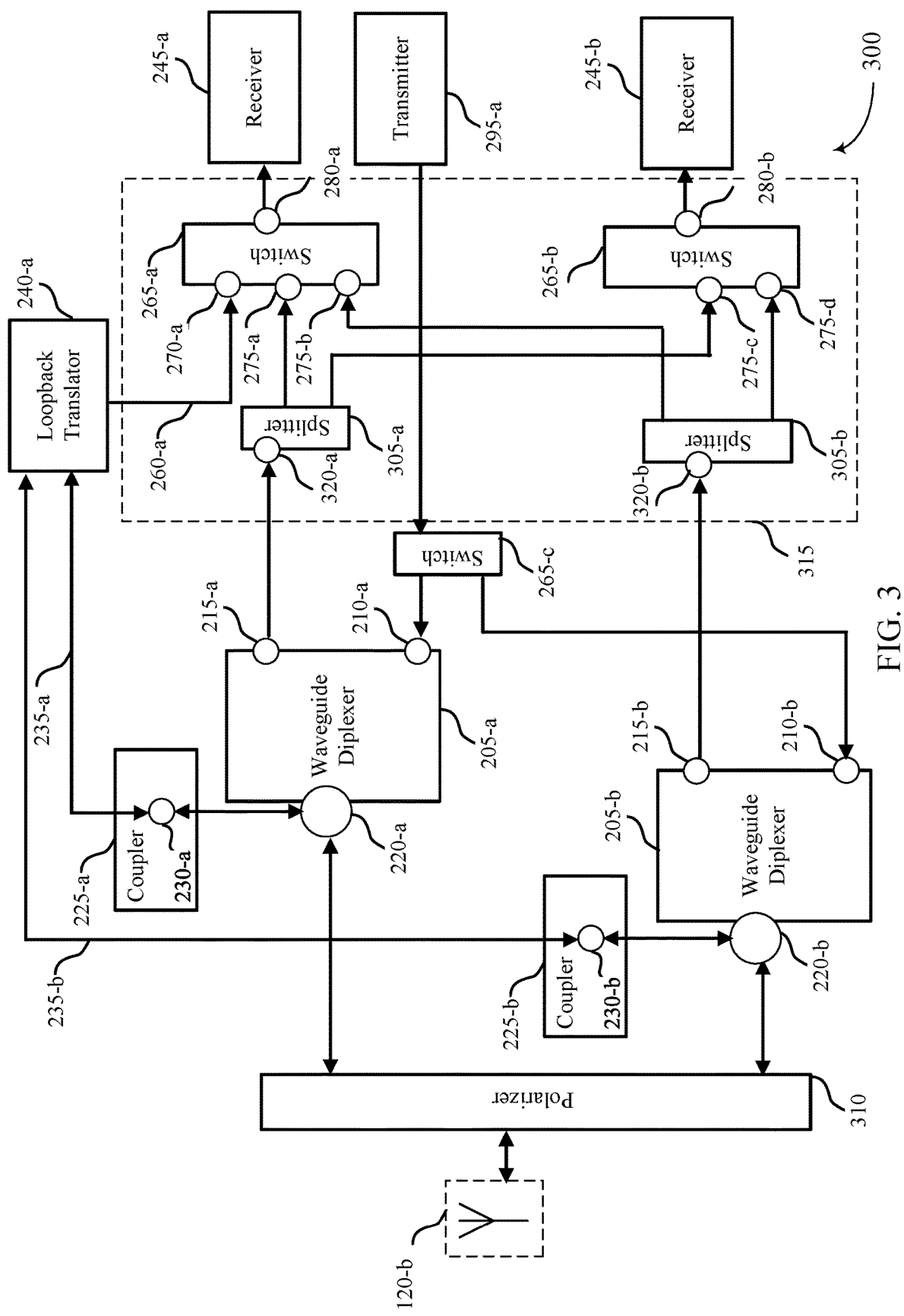
FIG. 3 illustrates an example of a transceiver that supports satellite terminal radio frequency loopback in accordance with aspects of the present disclosure.

FIG. 3 illustrates a simplified example of a transceiver 300 that supports satellite terminal radio frequency loopback in accordance with aspects of the present disclosure. In some examples, transceiver 300 may be an example of transceiver 115 in RF communication system 100. In some cases, transceiver 300 may include additional components that are omitted from FIG. 3 for clarity.

Transceiver 300 may depict an example of a transceiver that includes two waveguide diplexers and two receivers to enable transceiver 300 to concurrently receive, using the two receivers, two signals from a target device and/or to concurrently receive a signal from a target device and a translated loopback signal from a loopback translator.

Transceiver 300 includes antenna 120-*b*, which may be used to receive and transmit RF signals to and from a target device as depicted in FIG. 1. Antenna 120-*b* may include, for example, a horn antenna or feedhorn, and signals may be directed to antenna 120-*b* via a reflector (e.g., parabolic reflector).

Transceiver 300 includes two waveguide diplexers 205-*a*, 205-*b*. Waveguide diplexers 205-*a*, 205-*b* may be examples of waveguide diplexer 205 described with reference to FIG. 2 and may operate in a similar manner. Each waveguide diplexer 205-*a*, 205-*b* has a first individual port 210-*a*, 210-*b* associated with a transmit frequency range, a second individual port 215-*a*, 215-*b* associated with a receive frequency range different than the transmit frequency range, and a common port 220-*a*, 220-*b* coupled with the first individual port 210-*a*, 210-*b* and the second individual port 215-*a*, 215-*b* and associated with the transmit frequency range and the receive frequency range.

Transceiver 300 includes polarizer 310 for dividing or combining signals based on their polarization (e.g., RHCP, LHCP, linear polarizations). Polarizer 310 may enable a single antenna 120-*b* to be used with the two waveguide diplexers 205-*a*, 205-*b* by dividing received waves based on their polarization and by combining signals having different polarizations for transmission.

Polarizer 310 may be coupled with both waveguide diplexers 205-*a*, 205-*b*. Polarizer 310 may receive RF signals from a target device having a first and/or second polarization and may route signals of the first polarization (e.g., RHCP, first linear polarization) to waveguide diplexer 205-*a* and route signals of the second polarization (e.g., LHCP, second linear polarization) to waveguide diplexer 205-*b*, for example. Similarly, polarizer 310 may receive signals from waveguide diplexer 205-*a* and may polarize signals from waveguide diplexer 205-*a* to have the first polarization for transmission to the target device. Polarizer 310 may receive signals from waveguide diplexer 205-*b* and may polarize signals from waveguide diplexer 205-*b* to have the second polarization for transmission to the target device. In some cases, polarizer 310 may be a septum polarizer that may transfer energy of a received signal corresponding to different orthogonal basis polarizations (e.g., RHCP, LHCP) to different divided waveguides and convert component signals travelling from the different divided waveguides to the orthogonal basis polarizations in a combined polarization signal, for example.

Transceiver 300 includes bidirectional couplers 225-*a*, 225-*b*, each of which has a coupled port 230-*a*, 230-*b*. Couplers 225-*a*, 225-*b* may each be an example of a coupler 225 described with reference to FIG. 2.

Each coupled port 230-*a*, 230-*b* may be coupled with a common port 220-*a*, 220-*b* of a waveguide diplexer 205-*a*, 205-*b* and with a conductive connection 235-*a*, 235-*b* and may be used to couple RF signals from the respective common port 220-*a*, 220-*b* onto the conductive connection 235-*a*, 235-*b*, and/or to couple analog signals on conductive connection 235-*a*, 235-*b* into an RF signal in the respective common port 220-*a*, 220-*b*. That is, couplers 225-*a*, 225-*b* may each be used to induce (e.g., generate) an analog signal on a respective conductive connection 235-*a*, 235-*b* based on an RF signal in common port 220-*a*, 220-*b*, or to induce an RF signal in common port 220-*a*, 220-*b* based on an analog signal on conductive connection 235-*a*, 235-*b*.

In some cases, each coupler 225-a, 225-b may be configured to couple a transmit signal from common port 220-a, 220-b to induce a loopback signal on conductive connection 235-a, 235-b that is based on an RF transmit signal in the common port 220-a, 220-b. Thus, transceiver 300 may support loopback signals from either waveguide diplexer 205-a, 205-b.

Transceiver 300 includes loopback translator 240-a. Loopback translator 240-a may be an example of loopback translator 240 described with reference to FIG. 2. Loopback translator 240-a may be coupled with each coupled port 230-a, 230-b via respective conductive connection 235-a, 235-b and may be configured to obtain the loopback signal via either coupled port 230-a, 230-b. Loopback translator 240-a may be configured to translate the loopback signal from a frequency within the transmit frequency range to a frequency within the receive frequency range to generate a translated loopback signal.

Transceiver 300 includes two receivers 245-a, 245-b for receiving signals within the receive frequency range, and transceiver 300 includes a receive signal switch matrix 315 for routing the signals to the receivers 245-a, 245-b. In some cases, receive signal switch matrix 315 may enable either receiver 245-a or 245-b to receive signals from either waveguide diplexer 205-a or 205-b. Such signals may be signals received from a target device and/or translated loopback signals received from a loopback translator 240-a by looping the translated loopback signal back through one of the waveguide diplexers 205-a, 205-b. That is, receive signal switch matrix may be configured to input, to one receiver 245-a, a signal received from the target device while inputting, to the other receiver 245-b, a translated loopback signal.

In some cases, transceiver 300 (or portions of transceiver 300, such as some or all of receive signal switch matrix 315, receiver 245-a, 245-b, coupler 225-a, 225-b, and/or loopback translator 240-a) may be configured to operate in either a first mode associated with receiving signals from a target device or in a second mode associated with receiving a translated loopback signal to perform transmit signal compensation, as described with reference to FIG. 2.

For example, one of receivers 245-a, 245-b may be configured to, in the second mode, receive a translated loopback signal, compare the translated loopback signal with a representation of the transmit signal from which the loopback signal was coupled, and generate a compensation signal. In some cases, in the second mode, one receiver 245 may receive signals from a target device while the other receiver 245 receives and compares the translated loopback signal.

In some cases, the compensation signal may be provided to a transmitter 295-a in transceiver 200 to enable transmitter 295-a to adjust transmit signals based on the compensation signal, as described with reference to FIG. 2. Transmitter 295-a may be coupled with first individual ports 210-a, 210-b of waveguide diplexers 205-a, 205-b via switch 265-c and may be configured to output transmit signals (e.g., signals to be transmitted to a target device) to first individual ports 210-a, 210-b. Transmitter 295-a may be configured to output the transmit signals at a frequency within the transmit frequency range, for example. As discussed with reference to FIG. 2, transmitter 295-a may be configured to adjust transmit signals in a variety of manners, based on the compensation signal.

Receive signal switch matrix 315 includes two splitters 305-a, 305-b and two switches 265-a, 265-b. Each splitter 305-a, 305-b has an input port 320-a, 320-b that is coupled with a second individual port 215-a, 215-b of a waveguide diplexer 205-a, 205-b. In some cases, input ports 320-a, 320-b may be input ports of the receive signal switch matrix 315, for example.

Each splitter 305-a, 305-b may be configured to route separate instances of (e.g., split) a signal received via a waveguide diplexer 205-a, 205-b to receivers 245-a, 245-b via various input ports 275 of switches 265-a, 265-b.

Each switch 265-a, 265-b has an output port 280-a, 280-b coupled with a receiver 245-a, 245-b. In some cases, output ports 280-a, 280-b may be output ports of the receive signal switch matrix 315, for example. Each switch 265-a, 265-b may be configured to selectively provide signals to the corresponding receiver 245-a, 245-b by selecting an input port 275 to couple the selected input port 275 with the output port 280 of the switch 265.

Switch 265-a may include input port 270-a for receiving a translated loopback signal from loopback translator 240-a via conductive connection 260-a. Thus, switch 265-a may enable receiver 245-a to selectively receive a loopback signal via a direct loopback path, in a manner similar to that described for loopback path 255 in FIG. 2.

In transceiver 300, there may be multiple loopback paths between loopback translator 240-a and receivers 245-a, 245-b. For example, a translated loopback signal may be looped back, via conductive connection 235-a or 235-b, through either waveguide diplexer 205-a or waveguide diplexer 205-b (e.g., by coupling the translated loopback signal back into the common port 220-a, 220-b via coupled port 230-a, 230-b). The translated loopback signal may then be provided to receiver 245-a or receiver 245-b via second individual port 215-a, 215-b and receive signal switch matrix 315. As previously noted, transceiver 300 may also include a direct loopback path from loopback translator 240-a to receiver 245-a via switch 265-a.

Receivers 245-a, 245-b may be configured to receive a translated loopback signal from the loopback translator 240-a via a loopback path, and to compare the translated loopback signal with a representation of the transmit signal on which the loopback signal is based (e.g., the transmit signal from which the loopback signal was coupled). The inclusion of two waveguide diplexers 205-a, 205-b and two receivers 245-a, 245-b may provide transceiver 300 with additional flexibility for routing signals received from the target device and for routing loopback signals, thereby providing more flexibility for transceiver 300 to perform self-test, calibration, and transmission signal adjustment while transceiver 300 is communicating with a target device. For example, transceiver 300 may be able to use one receiver 245-a to perform signal compensation while the other receiver 245-b is actively receiving signals from a target device.

Although not shown in FIG. 3 for clarity, in some cases, transceiver 300 may include LNAs between the second individual ports 215-a, 215-b and the receivers 245-a, 245-b for amplifying a signal received from the target device or the translated loopback signal, such as depicted in FIG. 2. In some cases, transmitter 295-a may include a power amplifier as depicted in FIG. 2. In some cases, receivers 245-a, 245-b may be coupled with a processor in transceiver 300 in a manner similar to that shown in FIG. 2 and may be configured to compare the translated loopback signal with the representation of the transmit signal and generate the compensation signal via the processor; e.g., by providing the translated loopback signal to the processor.

FIG. 4 illustrates an example of a loopback translator 400 that supports satellite terminal radio frequency loopback in accordance with aspects of the present disclosure. In some examples, loopback translator 400 may be an example of loopback translator 240, 240-*a* as depicted in FIGS. 2 and 3. Loopback translator 400 may include various additional components that are not shown in FIG. 4 for simplicity. Moreover, other implementations of a loopback translator may also be used within a transceiver, such as transceiver 200, 300, without departing from the scope of the present disclosure.

Loopback translator 400 includes conductive connection 235-*c* that may be used for receiving a loopback signal from a waveguide diplexer, such as waveguide diplexer 205, 205-*a*, and/or for providing a translated loopback signal to the waveguide diplexer. Conductive connection 235-*c* may be an example of conductive connection 235, 235-*a* as depicted in FIGS. 2 and 3.

Loopback translator 400 may include combiner/divider 405-*a*. Combiner/divider 405-*a* may be coupled with conductive connection 235-*c* and configured to couple to conductive connection 235-*c* to filter 415-*a* and filter 415-*b* (potentially via switches 410 and 435, as described in more detail below). Combiner/divider 405-*a* may be configured to split an input signal into two output signals and/or to combine two input signals into a single output signal.

Filter 415-*a* may be configured to filter a loopback signal received via, for example, conductive connection 235-*c*. In some cases, filter 415-*a* may be associated with the transmit frequency range. For example, in some cases, the loopback signal may have a frequency within the transmit frequency range, and filter 415-*a* may be or include a band pass filter that may filter the loopback signal based on a pass band that is roughly centered on a center frequency of the transmit frequency range. In some cases, filter 415-*a* may be or include a high pass filter that may filter the loopback signal by passing signals having frequencies that are above a cutoff frequency, where the transmit frequency range is above the cutoff frequency.

Loopback translator 400 includes RF loopback attenuator 420. RF loopback attenuator 420 may be configured to attenuate (e.g., decrease) a power associated with the loopback signal before the loopback signal is translated to a frequency within the receive frequency range.

Loopback translator 400 includes local oscillator 425 and mixer 430 for translating the loopback signal from a frequency within the transmit frequency range to a frequency within the receive frequency range to prepare the loopback signal for reception by a receiver, such as receiver 245. Local oscillator 425 may generate a sinusoidal oscillator signal. Mixer 430 may be coupled with RF loopback attenuator 420 and local oscillator 425, and may be configured to generate, based on the oscillator signal and the loopback signal, a translated loopback signal having a frequency that is within the receive frequency range. In some cases, the local oscillator 425 may provide an oscillator signal having a frequency representing the difference between a center frequency of the transmit signals and the center frequency of the receive signals. Where the transmit frequency is greater than the receive frequency, the mixer 430 may be used to downconvert the loopback signal at the transmit frequency to the translated loopback signal within the receive frequency range. Where the transmit frequency is lower than the receive frequency, the mixer 430 may be used to upconvert the loopback signal at the transmit frequency to the translated loopback signal within the receive frequency range.

Loopback translator 400 includes filter 415-*b* coupled with mixer 430. Filter 415-*b* may be configured to filter the signal received from mixer 430 to pass the translated loopback signal. Filter 415-*b* may be associated with the receive frequency range. In some cases, filter 415-*b* may include a band pass filter to filter signals based on a pass band that is roughly centered on a center frequency of the receive frequency range. In some cases, filter 415-*b* may include a low pass filter that may filter signals by passing signals that are below a cutoff frequency, where the receive frequency range is below the cutoff frequency. In some cases, filter 415-*b* is configured to output the translated loopback signal.

Filter 415-*b* may be coupled with conductive connection 235-*c* (e.g., via combiner/divider 405-*a* and/or switch 435) to provide the translated loopback signal to a receiver. That is, in some cases, a loopback signal received from a waveguide diplexer may traverse a frequency translation path 440 in loopback translator 400 that includes filter 415-*a*, RF loopback attenuation 420, mixer 430, and filter 415-*b* to generate and output the translated loopback signal as an output of filter 415-*b*. The translated loopback signal may then be provided to a receiver, such as receiver 245-*a*, 245-*b* described with reference to FIGS. 2 and 3.

In some cases, loopback translator 400 may include conductive connection 260-*b*, which may be configured to provide a translated loopback signal to a receiver without looping back through a waveguide diplexer. Conductive connection 260-*b* may be an example of conductive connections 260, 260-*a* described with reference to FIGS. 2 and 3.

In some cases, if loopback translator includes conductive connection 260-*b*, loopback translator may include switch 435 to select a loopback path by which to provide the translated loopback signal to a receiver. That is, switch 435 may select a loopback path that loops back through a waveguide diplexer (e.g., via combiner/divider 405-*a* and conducive connection 235-*c*) by selecting a first output or may select a loopback path that provides the translated loopback signal directly to the receiver (e.g., via conductive connection 260-*b*) by selecting a second output.

For transceivers that include two waveguide diplexers such as transceiver 300 of FIG. 3, loopback translator 400 may include additional circuitry (e.g., conductive connection 235-*d*, combiner/divider 405-*b*, switch 410, and/or switch 435) to enable loopback translator 400 to communicate loopback signals and translated loopback signals with two waveguide diplexers and two receivers, for example. In this case, loopback translator 400 may depict an example of a loopback translator that may be used in a transceiver having two waveguide diplexers, such as transceiver 300 depicted in FIG. 3.

For example, conductive connection 235-*d* may be used for receiving a loopback signal from a second waveguide diplexer, such as waveguide diplexer 205-*b*, and/or for providing a translated loopback signal to the second waveguide diplexer. Conductive connection may be an example of conductive connection 235-*b* described with reference to FIG. 3.

Combiner/divider 405-*b* may be coupled with conductive connection 235-*d* and may be configured to couple conductive connection 235-*d* to switch 410 and switch 435. Combiner/divider 405-*b* may be configured to split an input signal into two output signals and/or to combine two input signals into a single output signal.

Switch 410 may be coupled with conductive connections 235-*c*, 235-*d* (e.g., via combiner/dividers 405-*a* and/or 405-*b*). Switch 410 may also be coupled with filter 415-*a* and may be configured to route a loopback signal received via either conductive connection 235-*c* (e.g., received from a first waveguide diplexer) or conductive connection 235-d (e.g., received from a second waveguide diplexer) to filter 415-a.

Similarly, switch 435 may be coupled with conductive connections 235-c, 235-d (e.g., via combiner/dividers 405-a, 405-b) and with conductive connection 260-b, if present. Switch 435 may also be coupled with filter 415-b and may be configured to route a translated loopback signal to conductive connection 260-b, to conductive connection 235-c (e.g., to a first waveguide diplexer) or to conductive connection 260-c (e.g., to a second waveguide diplexer).

Thus, loopback translator 400 may, in some cases, be configured to receive loopback signals from either of two waveguide diplexers, route a received loopback signal through a frequency translation path 440 to translate the loopback signal to a translated loopback signal, and route the translated loopback signal to either of two receivers by routing the translated loopback signal back through either of the two waveguide diplexers or directly to a receiver.

In some cases, the inclusion of switch 410 and switch 435 may enable a transceiver 300 (e.g., a controller in transceiver 300) to select a coupler 225-a or coupler 225-b for the loopback path based on various optimization and scheduling criteria. Such criteria may include, for example, whether a waveguide diplexer 205-a, 205-b associated with a coupler 225-a, 225-b is currently receiving a signal from the target device, whether providing the translated loopback signal to coupler 225-a, 225-b is likely to cause interference with other signals at waveguide diplexer 205-a, 205-b, etc.

FIG. 5 illustrates an example of a waveguide device 500 that supports satellite terminal radio frequency loopback in accordance with aspects of the present disclosure.

Waveguide device 500 includes waveguide diplexer 205-c, which may be an example of waveguide diplexer 205, 205-a, 205-b described with reference to FIGS. 2 and 3. Waveguide diplexer 205-c may be designed to pass certain frequencies of an RF signal and reject other frequencies. That is, in some cases, the waveguides coupled with the ports of waveguide diplexer 205 may be configured to act as filters for RF signals, as shown in FIG. 5.

Waveguide diplexer 205-c includes first individual port 210-c, which may be associated with communicating (e.g., transmitting) signals in the transmit frequency range. For example, waveguide diplexer 205-c may include Tx filter 535, which may be a highpass, lowpass, or bandpass filter. Waveguide diplexer includes second individual port 215-c, which may be associated with communicating (e.g., receiving) signals in the receive frequency range. For example, waveguide diplexer 205-c may include Rx filter 525, which may be a highpass, lowpass, or bandpass filter. Where the transmit frequency range is higher than the receive frequency range, for example, the Tx filter 535 may be a highpass or bandpass filter, and the Rx filter 525 may be a lowpass or bandpass filter. Waveguide diplexer includes common port 220-c, which may be associated with communicating signals in both the transmit frequency range and receive frequency range. Common port 220-c may be coupled with first individual port 210-c and with second individual port 215-c (e.g., via a waveguide junction). Common port 220-c may be coupled with an antenna.

Waveguide device 500 includes coupled port 230-c, which may be an example of coupled port 230, 230-a, or 230-b described with reference to FIGS. 2 and 3. Waveguide device includes coupling hole 505, which may be a hole in a waveguide associated with common port 220-c. Coupled port 230-c and coupling hole 505 may be included in or may be an example of a bidirectional coupler, such as coupler 225, 225-a, 225-b described with reference to FIGS. 2 and 3.

Coupling hole 505 may be used to couple signals between common port 220-c and a conductive connection (e.g., conductive connection 235) that is coupled with coupling hole 505 via coupled port 230-c. In some cases, coupling hole 505 may couple signals by coupling power or energy between the conductive connection and the common port 220-c.

In some cases, coupling hole 505 may be used to couple a loopback signal onto a conductive connection from a transmit signal in common port 220-c, such as to provide a loopback signal to a loopback translator. In some cases, coupling hole 505 may be used to couple a translated loopback signal from the conductive connection into the common port 220-c, such as to provide the translated loopback signal to a receiver via the loopback path 250 of FIG. 2, for example.

In some cases, coupling hole 505 may be configured to provide a particular coupling value, which may represent a percentage of energy or power that is coupled. In some cases, it may be desirable to design coupling hole 505 such that the coupling value is low enough not to disturb transmit signals in common port 220-c but high enough to provide a sufficiently strong loopback signal, for example. In some cases, the size or location of coupling hole 505 may be selected to provide low enough coupling (e.g., a low coupling value) to avoid disturbing transmit signals while providing high enough coupling to reduce the variability of the coupled signal.

For example, in some cases, the size of coupling hole 505 may be configured such that coupling hole 505 has a cutoff frequency above the transmit or receive frequency ranges and therefore couples evanescent mode energy without coupling propagating mode energy. For example, coupling hole 505 may be a circular hole that is small enough to have a cutoff frequency higher than signals in common port 220-c. This technique may reduce the impact of the coupler on transmit signals, for example.

In some cases, coupling hole 505 may be located in an E-plane wall of common port 220-c. An E-plane may be a plane associated with an electric field vector, for example, which may be orthogonal to an H-plane that is a plane associated with a magnetic field vector. In general, the center of an E-plane wall may have little to no current, and therefore the coupling hole 505 may be offset from the center of the E-plane wall to provide better coupling, and a position, size, and cross-sectional shape of the coupling hole 505 may be selected to provide a desired amount of coupling.

In some cases, coupled port 230-c may be part of waveguide diplexer 205-c or may be a separate device. For example, common port 220-c may be coupled with an additional waveguide for transmitting and receiving signals, and coupled port 230-c may be coupled with the additional waveguide.

Figure 6:
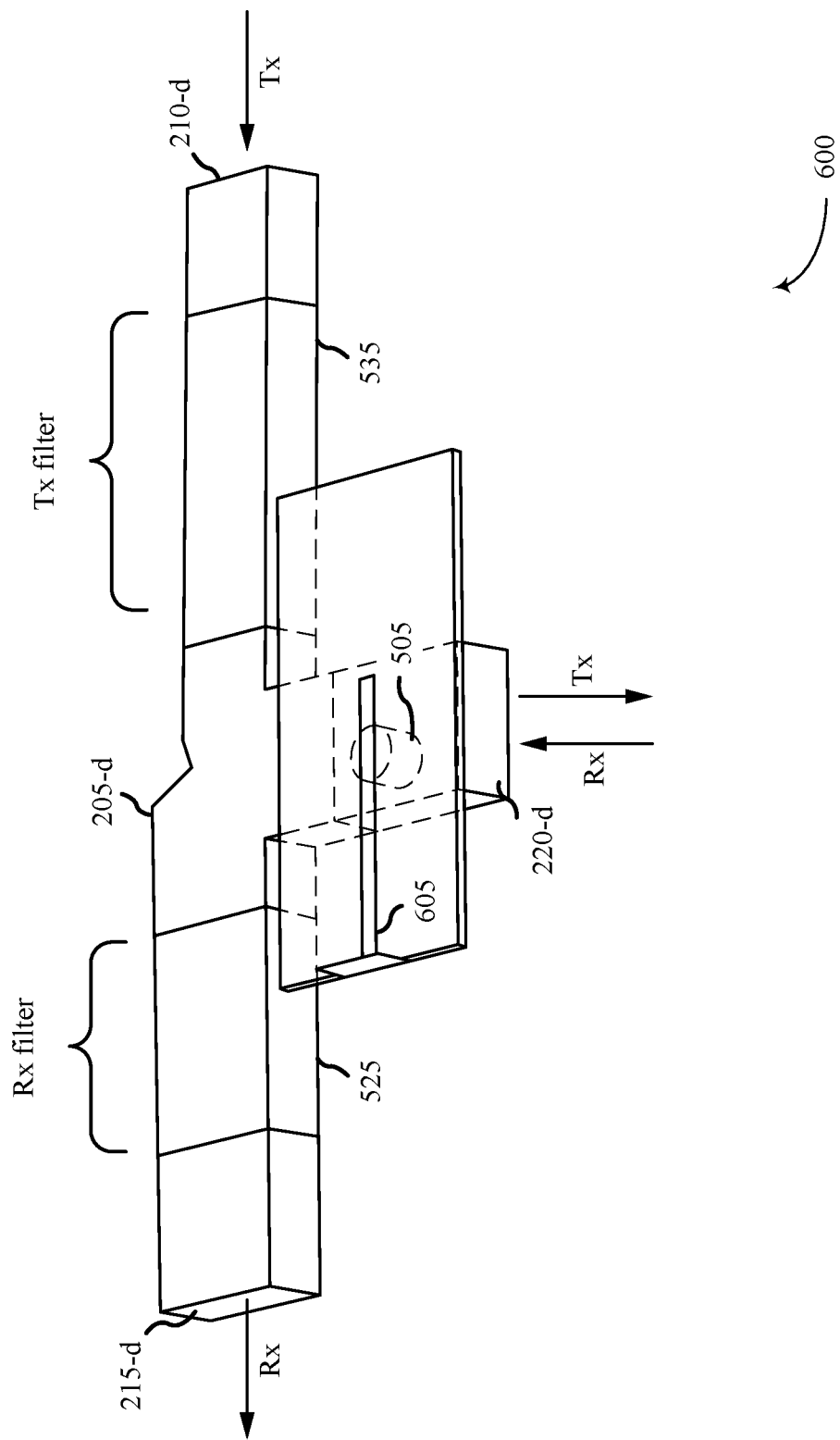
FIG. 6 illustrates an example of a waveguide device that supports satellite terminal radio frequency loopback in accordance with aspects of the present disclosure.

FIG. 6 illustrates an example of a waveguide device 600 that supports satellite terminal radio frequency loopback in accordance with aspects of the present disclosure. In some examples, waveguide device 600 may implement aspects of waveguide diplexer 205, 205-a, 205-b and coupler 225, 225-a, 225-b as depicted in FIGS. 2 and 3.

Waveguide device 600 includes waveguide diplexer 205-d having a first individual port 210-d, second individual port 215-d, and common port 220-d. Waveguide diplexer 205-d may be an example of waveguide diplexer 205-c as described with reference to FIG. 5, for example. Waveguide device 600 includes microstrip 605, which may be a conductive element that spans coupling hole 505. Microstrip 605 may be separated from the coupling hole 505 by a dielectric layer, for example. Microstrip 605 may be part of a coupler, such as coupler 225, and may be used to conduct (e.g., couple) RF energy onto a conductive connection, such as conductive connection 235, 235-a, 235-b described with reference to FIGS. 2 and 3. Microstrip 605 may be a shielded microstrip, for example covered by a housing (not shown) shielding the top of microstrip 605. Microstrip 605 may also include one or more impedance matching stubs (not shown), which may be located on one or both sides of coupling hole 505.

Figure 7:
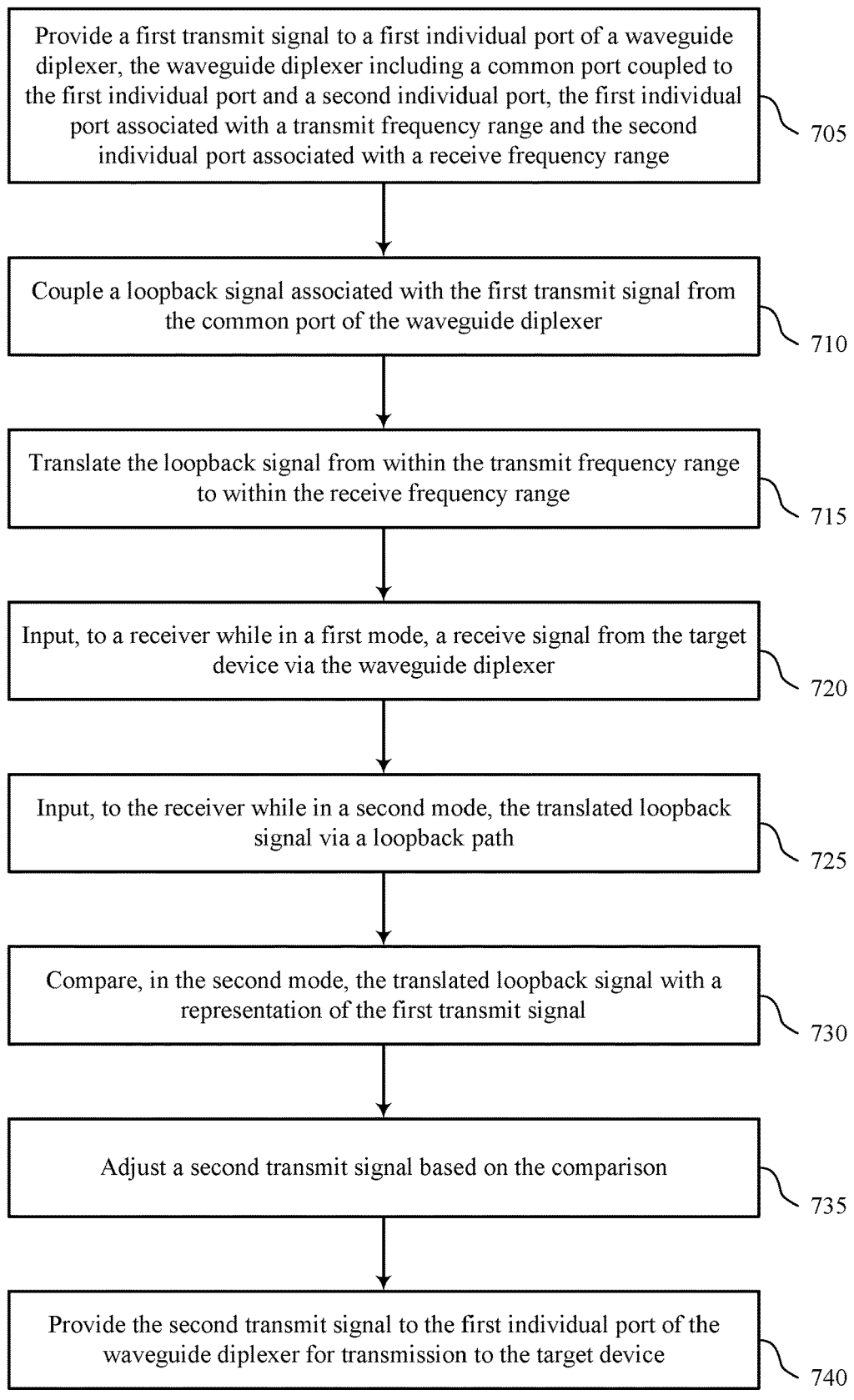
FIG. 7 illustrates an example of a method that supports satellite terminal radio frequency loopback in accordance with aspects of the present disclosure.

FIG. 7 illustrates an example of a method 700 that supports satellite terminal radio frequency loopback in accordance with aspects of the present disclosure. In some examples, method 700 may implement aspects of RF communication system 100.

Block 705 may include providing a first transmit signal to a first individual port of a waveguide diplexer, such as first individual port 210, 210-a, 210-b of waveguide diplexer 205, 205-a, 205-b, for example. The waveguide diplexer may include a common port coupled to the first individual port and a second individual port, such as common port 220, 220-a, 220-b, for example, which is coupled with first individual port 210, 210-a, 210-b and second individual port 215, 215-b, 215-c, respectively. The first individual port may be associated with a transmit frequency range and the second individual port may be associated with a receive frequency range. The first transmit signal may be within the transmit frequency range, for example.

Block 710 may include coupling a loopback signal associated with the first transmit signal from the common port of the waveguide diplexer. In some cases, the loopback signal may be coupled from the common port of the waveguide diplexer using a bidirectional coupler, such as coupler 225, 225-a, 225-b, for example.

Block 715 may include translating the loopback signal from within the transmit frequency range to within the receive frequency range. In some cases, the loopback signal is translated from within the transmit frequency range to within the receive frequency range by a loopback translator, such as loopback translator 240, 240-a, 240-b, for example.

Block 720 may include inputting, to a receiver while in a first mode, a receive signal from the target device via the waveguide diplexer. In some cases, the receive signal may be input to the receiver via the second individual port of the waveguide diplexer and/or via a switch, such as switch 265, 265-a, that is coupled with the second individual port of the waveguide diplexer. In some cases, Block 725 may include inputting, to the receiver while in a second mode, the translated loopback signal via a loopback path. In some cases, the translated loopback signal may be input to the receiver via a loopback path that may include the common port and second individual port of the waveguide diplexer or may include a conductive connection such as conductive connection 260. In some cases, the translated loopback signal may be input to the receiving via a switch, such as switch 265, that is coupled with the second individual port of the waveguide diplexer and/or with the conductive connection. In some cases, the switch may be configured to, in the second mode, establish a loopback path (e.g., loopback path 250, 255, or another loopback path) to output the translated loopback signal to the receiver. In some cases, the loopback path may include a common port and second individual port of a waveguide diplexer. In some cases, the receive signal is input to the receiver during a first time interval and the translated loopback signal is input to the receiver during a second time interval.

Block 730 may include comparing, in the second mode, the translated loopback signal with a representation of the first transmit signal. In some cases, the receiver may compare the translated loopback signal with a representation of the first transmit signal using a receive processor, such as receive processor 285-a, for example. In some cases, the representation of the first transmit signal may be a digital representation that is stored by receive processor 285-a or by a transmit processor, such as transmit processor 285-b, for example.

Block 735 may include adjusting a second transmit signal based at least in part on the comparison. The second transmit signal may be, for example, a signal that is transmitted (or is scheduled to be transmitted) to a target device after the loopback signal has been coupled from a previous transmit signal. That is, the loopback signal from the first transmit signal may be used to adjust a subsequent transmit signal. In some cases, a transmitter, such as transmitter 295, 295-a, may adjust the second transmit signal by adjusting a frequency, a phase, a polarity, a symbol rate, a slew rate, a frequency-dependent gain slope, a frequency-dependent phase variation, a time-dependent transient amplitude, a time-dependent transient phase, a frequency and amplitude dependent amplitude-modulation, a frequency and amplitude dependent phase modulation, or a transmit power of the transmit signals. In some cases, a transmitter may be configured to adjust the second transmit signal using a transmit processor, such as transmit processor 285-b, or using other hardware or software.

Block 740 may include providing the second transmit signal to the first individual port of the waveguide diplexer for transmission to the target device. In some cases, the second transmitted signal is provided, by the transmitter, to the first individual port after the second transmit signal has been adjusted, for example. In some cases, the Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A transceiver for communicating with a target device, the transceiver comprising:
   a waveguide diplexer comprising a common port coupled to first and second individual ports, the first individual port associated with a transmit frequency range and the second individual port associated with a receive frequency range;
   a transmitter coupled with the first individual port of the waveguide diplexer and configured to output a transmit signal to the first individual port within the transmit frequency range;
   a bidirectional coupler having a coupled port coupled with the common port of the waveguide diplexer;
   a loopback translator coupled with the coupled port and configured to obtain a loopback signal associated with the transmit signal via the coupled port, and to translate the loopback signal from within the transmit frequency range to within the receive frequency range; and
   a receiver having in input port coupled with the second individual port of the waveguide diplexer and coupled with the loopback translator via a loopback path, wherein the receiver is configured to, in a first mode, obtain a received signal from the target device via the waveguide diplexer, and, in a second mode, obtain the translated loopback signal via the loopback path and compare the translated loopback signal to a representation of the transmit signal to generate a compensation signal,
   wherein the transmitter is further configured to receive the compensation signal and adjust the transmit signal based at least in part on the compensation signal.

2. The transceiver of claim 1, wherein, in the second mode:
   the loopback translator is configured to output the translated loopback signal to the coupler to couple the translated loopback signal into the common port of the waveguide diplexer, wherein the loopback path includes a portion of the waveguide diplexer comprising the common port and the second individual port.

3. The transceiver of claim 1, further comprising:
   a switch having a first input port coupled with the second individual port of the waveguide diplexer, a second input port coupled with the loopback translator via the loopback path, and an output port coupled with the input port of the receiver, the switch configured to output to the receiver, in the first mode, the received signal, and to output to the receiver, in the second mode, the translated loopback signal.

4. The transceiver of claim 1, wherein the waveguide diplexer is a first waveguide diplexer, the bidirectional coupler is a first bidirectional coupler, the receiver is a first receiver, and the received signal from the target device is a first received signal, further comprising:

a second waveguide diplexer comprising a common port coupled to third and fourth individual ports, the third individual port associated with the transmit frequency range and the fourth individual port associated with the receive frequency range;

a second bidirectional coupler having a coupled port coupled with the common port of the second waveguide diplexer a second receiver; and a receive signal switch matrix having a first input port coupled with the second individual port of the first waveguide diplexer, a second input port coupled with fourth individual port of the second waveguide diplexer, a first output port coupled with the first receiver, and a second output port coupled with the second receiver, and configured to output the first received signal or a second received signal from the target device on the first output port and the first received signal or the second received signal on the second output port.

5. The transceiver of claim 4, wherein the first receiver is configured to obtain, in the second mode, the translated loopback signal concurrently with the second receiver obtaining the first signal or the second signal via the receive signal switch matrix.

6. The transceiver of claim 4, wherein, in the second mode:

the loopback translator is configured to output the translated loopback signal to the second coupler to couple the translated loopback signal into the common port of the second waveguide diplexer, wherein the loopback path includes a portion of the second waveguide diplexer comprising the common port and the fourth individual port.

7. The transceiver of claim 4, further comprising:

a polarizer coupled with the common ports of the first and second waveguide diplexers, the polarizer configured to divide a received wave into the first and second signals according to respective polarizations of the first and second signals in the received wave.

8. The transceiver of claim 4, wherein the first receiver is configured to receive, in the second mode, the translated loopback signal from the loopback translator substantially continuously while the transceiver is communicating with the target device.

9. The transceiver of claim 1, further comprising a low noise amplifier between the second individual port of the waveguide diplexer and the receiver.

10. The transceiver of claim 1, wherein the receiver is configured to enter the second mode periodically to receive the translated loopback signal from the loopback translator.

11. The transceiver of claim 1, wherein the receiver is configured to enter the second mode to obtain the translated loopback signal from the loopback translator based at least in part on a scheduling of downlink communications from the target device.

12. The transceiver of claim 1, wherein the coupler comprises a coupling hole on a waveguide associated with the common port.

13. The transceiver of claim 12, wherein the coupler further comprises a microstrip spanning the coupling hole.

14. The transceiver of claim 13, wherein the microstrip is separated from the coupling hole by a dielectric layer.

15. The transceiver of claim 1, wherein the transmitter comprises:

a power amplifier coupled with the first individual port of the waveguide diplexer for amplifying the adjusted transmit signal.

16. The transceiver of claim 1, wherein the transmitter is configured to adjust the transmit signal by adjusting a frequency, a phase, a polarity, a symbol rate, a slew rate, a frequency-dependent gain slope, a frequency-dependent phase variation, a time-dependent transient amplitude, a time-dependent transient phase, a frequency and amplitude dependent amplitude-modulation, a frequency and amplitude dependent phase modulation, or a transmit power of the transmit signals.

17. A method for compensating transmit signals transmitted to a target device, the method comprising:

providing a first transmit signal to a first individual port of a waveguide diplexer, the waveguide diplexer comprising a common port coupled to the first individual port and a second individual port, the first individual port associated with a transmit frequency range and the second individual port associated with a receive frequency range;

coupling a loopback signal associated with the first transmit signal from the common port of the waveguide diplexer;

translating the loopback signal from within the transmit frequency range to within the receive frequency range;

inputting, to a receiver while in a first mode, a receive signal from the target device via the waveguide diplexer;

inputting, to the receiver while in a second mode, the translated loopback signal via a loopback path;

comparing, in the second mode, the translated loopback signal with a representation of the first transmit signal;

adjusting a second transmit signal based at least in part on the comparison; and providing the second transmit signal to the first individual port of the waveguide diplexer for transmission to the target device.

18. The method of claim 17, further comprising, in the second mode:

coupling the translated loopback signal into the common port of the waveguide diplexer, wherein the loopback path includes a portion of the waveguide diplexer comprising the common port and the second individual port.

19. The method of claim 17, further comprising:

establishing, in the second mode, the loopback path via a switch configured to output to the receiver, in the first mode, the received signal, and to output to the receiver, in the second mode, the translated loopback signal.

20. The method of claim 17, wherein the inputting the signal to the receiver in the first mode is during a first time interval and the inputting the translated loopback signal to the receiver in the second mode is during a second time interval.

21. The method of claim 17, wherein the waveguide diplexer is a first waveguide diplexer, the receiver is a first receiver, and the received signal from the target device is a first received signal, the method further comprising:

receiving, from the target device, a receive wave at a common port of a second waveguide diplexer, the second waveguide diplexer having a third individual port associated with the transmit range and a fourth individual port associated with the receive frequency range, the second waveguide diplexer outputting a second receive signal within the receive frequency range at the fourth individual port of the second waveguide diplexer; and inputting, to a second receiver, the second receive signal concurrently with inputting the translated loopback signal to the first receiver.

22. The method of claim 21, wherein the first transmit signal is transmitted during a first time interval, and wherein the loopback signal is a first loopback signal, the method further comprising:

providing a third transmit signal to the third individual port of the second waveguide diplexer during a second time interval, the third transmit signal within the first frequency range;

coupling a second loopback signal associated with the third transmit signal from the common port of the second waveguide diplexer;

translating the second loopback signal from within the first frequency range to within the second frequency range;

receiving, using the first receiver, the translated second loopback signal;

comparing, using the first receiver, the translated second loopback signal with a representation of the third transmit signal;

adjusting a fourth transmit signal based at least in part on the comparison; and providing the adjusted fourth transmit signal to the second waveguide diplexer for transmission to the target device.

23. The method of claim 17, wherein the waveguide diplexer is a first waveguide diplexer, the receiver is a first receiver, the method further comprising:

receiving, from the target device, a receive wave within the receive frequency range at the common port of the first waveguide diplexer, the first waveguide diplexer outputting the receive signal at the second individual port based at least in part on the receive wave;

coupling the translated loopback signal into a common port of a second waveguide diplexer, the second waveguide diplexer having a third individual port associated with the transmit range and a fourth individual port associated with the receive frequency range, wherein the loopback path includes a portion of the second waveguide diplexer comprising the common port and the fourth individual port; and inputting, to a second receiver, the receive signal concurrently with inputting the translated loopback signal to the first receiver.

24. The method of claim 17, wherein adjusting the second transmit signal comprises adjusting a frequency, a phase, a polarity, a symbol rate, a slew rate, a frequency-dependent gain slope, a frequency-dependent phase variation, a time-dependent transient amplitude, a time-dependent transient phase, a frequency and amplitude dependent amplitude-modulation, a frequency and amplitude dependent phase modulation, or a transmit power of the second transmit signal.

25. The method of claim 17, further comprising:
storing one or more calibration values based at least in part on the comparison.

26. The method of claim 17, further comprising:
entering the second mode in response to receiving a command.

27. The method of claim 17, further comprising:
determining an availability of the receiver for comparing the translated loopback signal to the representation of the first transmit signal based at least in part on a scheduling of communications from the target device; and performing the comparing of the translated loopback signal to the representation of the first transmit signal based at least in part on the availability.

* * * * *